US012780637B2

(12) United States Patent
Yu

(10) Patent No.: US 12,780,637 B2
(45) Date of Patent: Nov. 3, 2026

(54) CONTAINER OPENING TOOL

(71) Applicant: Jianyong Yu, Linhai City (CN)

(72) Inventor: Jianyong Yu, Linhai City (CN)

( * ) Notice: Subject to any disclaimer, the term of this patent is extended or adjusted under 35 U.S.C. 154(b) by 323 days.

(21) Appl. No.: 18/543,462

(22) Filed: Dec. 18, 2023

(65) Prior Publication Data

US 2025/0197183 A1 Jun. 19, 2025

(51) Int. Cl.

*B67B 7/44* (2006.01)
*B67B 7/12* (2006.01)
*B67B 7/42* (2006.01)

(52) U.S. Cl.

CPC .................. *B67B 7/44* (2013.01); *B67B 7/12* (2013.01); *B67B 7/42* (2013.01)

(58) Field of Classification Search

None
See application file for complete search history.

(56) References Cited

U.S. PATENT DOCUMENTS 936,678 A * 10/1909 Sommer ................... B67B 7/44 30/113
2,486,523 A * 11/1949 Deschenes ................ B67B 7/44 7/152
2,910,769 A * 11/1959 Schneider ................. B67B 7/44 D8/40
4,167,056 A * 9/1979 Nattel ..................... B25B 31/00 D8/19
4,967,436 A * 11/1990 Russell ..................... B67B 7/44 7/164
6,502,483 B1 * 1/2003 Swank .................... B25B 13/56 81/177.4
9,676,603 B1 * 6/2017 Oakley ................. B67B 7/0423
11,161,225 B2 * 11/2021 Prescott ................ B25B 15/008
2007/0283789 A1 * 12/2007 Zeidler ................... B25B 13/56 81/125.1
2013/0327184 A1 * 12/2013 Nelson ...................... B67B 7/16 29/592
2014/0237952 A1 * 8/2014 Fesler ....................... B67B 7/24 81/3.47

* cited by examiner

*Primary Examiner* — Brian D Keller
(74) *Attorney, Agent, or Firm* — MUNCY, GEISSLER, OLDS & LOWE, P.C.

(57) ABSTRACT

A container opening tool is provided, including: a main body, a first engaging portion, a second engaging portion, a third engaging portion and a fourth engaging portion. The main body defines a longitudinal direction and includes a first end portion and a second end portion disposed on two sides of the main body. The first engaging portion is disposed on the first end portion. The second engaging portion is disposed on the first end portion and includes a first mouth opening in a first direction lateral to the longitudinal direction. The third engaging portion is disposed on the first end portion and includes a second mouth opening in a second direction lateral to the first direction and the longitudinal direction. The fourth engaging portion is disposed on the second end portion and includes a through hole extending in the first direction.

9 Claims, 8 Drawing Sheets

CONTAINER OPENING TOOL

BACKGROUND OF THE INVENTION

Field of the Invention

The present invention relates to a container opening tool.

Description of the Prior Art

Containers with lids are usually used to contain paint, oil, resin, chemical reagent, or other fluid. Depending on package requirements, the containers may be made of plastic or metal materials in various sizes and types, and the configurations of the lids are designed accordingly to achieve sealing effect. Many types of containers are available commercially, such as five-gallon buckets, plastic or metal paint buckets, tight head steel drums, 20 L drums, etc.

However, to remove the lids of different types of the containers, different types of openers are required, which is inconvenient. In addition, the conventional openers are poorly designed and laborious to operate. The present invention is, therefore, arisen to obviate or at least mitigate the above-mentioned disadvantages.

SUMMARY OF THE INVENTION

The main object of the present invention is to provide a container opening tool which is multifunctional and labor-saving.

To achieve the above and other objects, the present invention provides a container opening tool, including: a main body, a first engaging portion, a second engaging portion, a third engaging portion and a fourth engaging portion. The main body defines a longitudinal direction and includes a first end portion and a second end portion disposed on two opposite sides of the main body in the longitudinal direction. The first engaging portion is disposed on the first end portion and extends in the longitudinal direction. The second engaging portion is disposed on the first end portion and includes a first mouth opening in a first direction lateral to the longitudinal direction. The third engaging portion is disposed on the first end portion and includes a second mouth opening in a second direction lateral to the first direction and the longitudinal direction. The fourth engaging portion is disposed on the second end portion and includes a through hole extending in the first direction.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
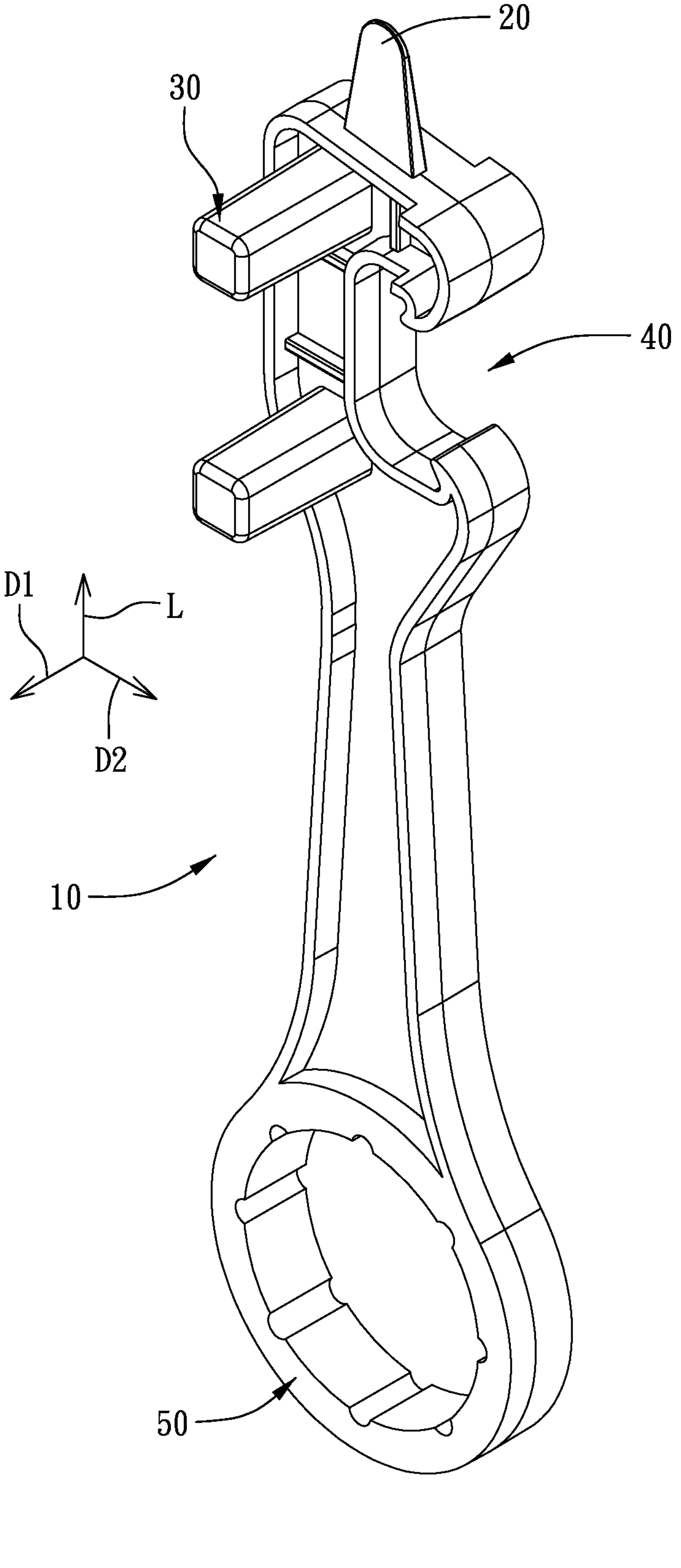
FIGS. 1 and 2 are stereograms of a preferable embodiment of the present invention as viewed in different sides.

Please refer to FIGS. 1 to 8 for a preferable embodiment of the present invention. A container opening tool 1 of the present invention includes a main body 10, a first engaging portion 20, a second engaging portion 30, a third engaging portion 40 and a fourth engaging portion 50.

The main body 10 defines a longitudinal direction L and includes a first end portion 11 and a second end portion 12 disposed on two opposite sides of the main body 10 in the longitudinal direction L. The first engaging portion 20 is disposed on the first end portion 11 and extends in the longitudinal direction L. The second engaging portion 30 is disposed on the first end portion 11 and includes a first mouth 31 opening in a first direction D1 lateral to the longitudinal direction L. The third engaging portion 40 is disposed on the first end portion 11 and includes a second mouth 41 opening in a second direction D2 lateral to the first direction D1 and the longitudinal direction L. The fourth engaging portion 50 is disposed on the second end portion 12 and includes a through hole 51 extending in the first direction D1. Therefore, the container opening tool 1 is multifunctional and labor-saving.

Specifically, the main body 10 further includes a connecting section 13 connected between the first end portion 11 and the second end portion 12, and a width of the connecting section 13 is gradually increased in the longitudinal direction L toward the second end portion 12. The connecting section 13 includes a necked portion 131 connected with the first end portion 11, and in the longitudinal direction L, a width of the necked portion 131 is smaller than the first end portion 11 and the second end portion 12. Therefore, the connecting section 13 provides good structural strength and is convenient to grip, and the necked portion 131 allows the first end portion 11 to be operated in a large angle so as to be applicable to various environments.

Figure 2:
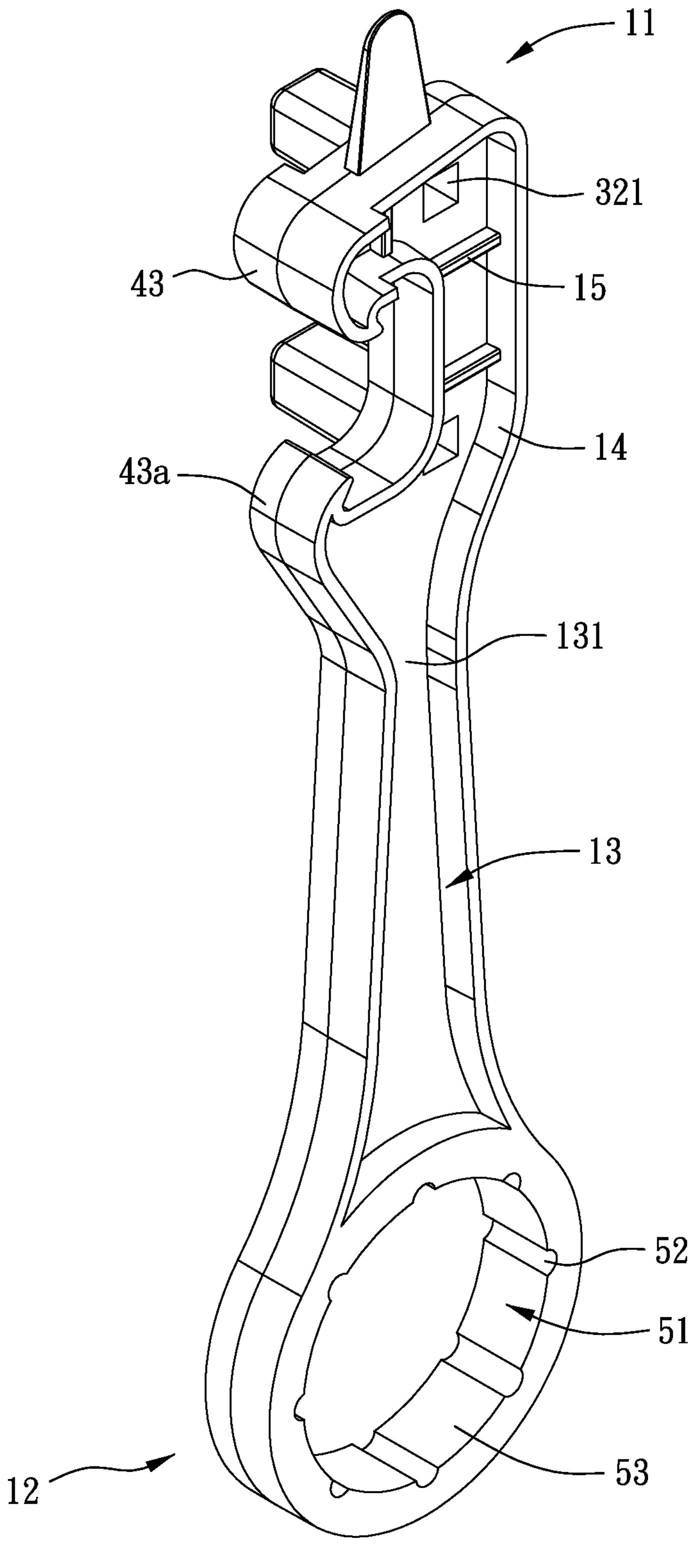
Figure 3:
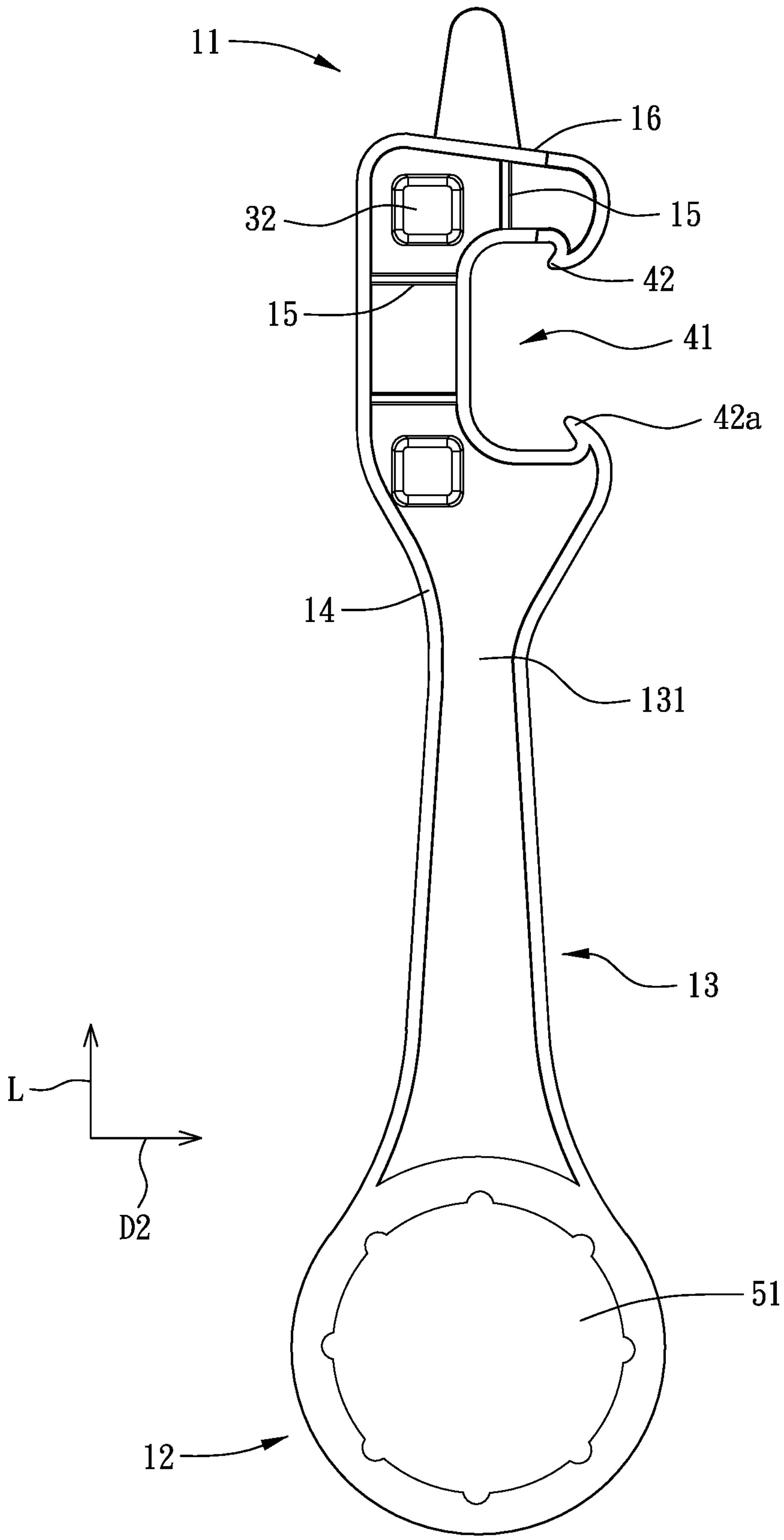
FIG. 3 is a front view of FIG. 1.

The main body 10 further includes a peripheral wall 14 extending along an outer contour of the main body 10, and at least one rib 15 is connected between two portions of the peripheral wall 14 spaced apart from each other so as to have good structural strength. As shown in FIGS. 1 and 2, two opposite sides of the main body 10 in the first direction D1 respectively have at least one said rib 15 disposed thereon; preferably, one of said ribs 15 corresponds to another one of the said ribs 15 in the first direction D1. As such, a thickness of the main body 10 can be appropriately decreased for lightweight, and the said ribs 15 locally increase a structural strength of the main body 10.

Figure 5:
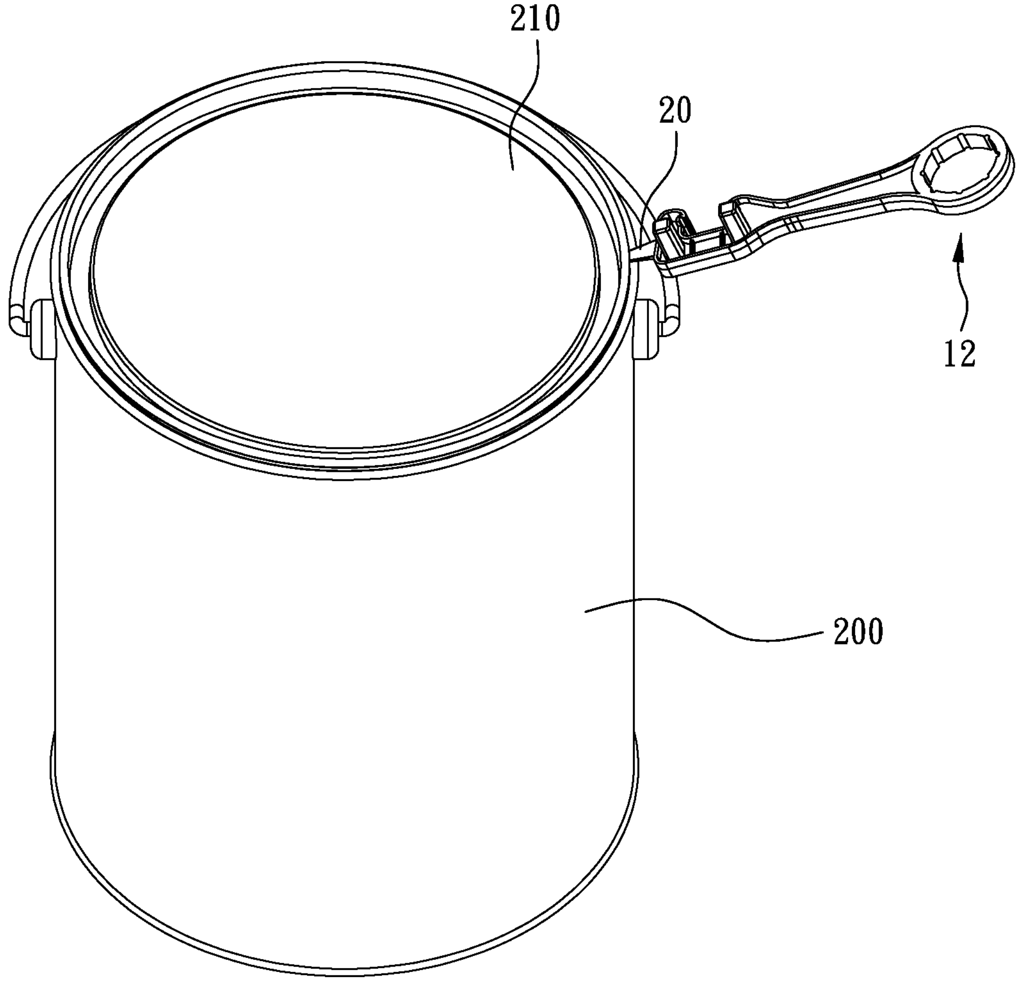
FIG. 5 is a drawing showing operation of a first engaging portion according to a preferable embodiment of the present invention.

The first engaging portion 20 is a plate extending from an end surface 16 of the main body 10, and a thickness of the plate is gradually decreased in a direction remote from the second end portion 12 so that the plate is easy to be inserted between a container 200 and its lid 210, as shown in FIG. 5. Therefore, the second end portion 12 can be pressed downward to lever open the lid 210, which is laborsaving. Preferably, the end surface 16 extends obliquely relative to the second direction D2, therefore, a corner of the first end portion 11 remote from the second mouth 41 has sufficient structural strength and is not easy to deform.

Figure 6:
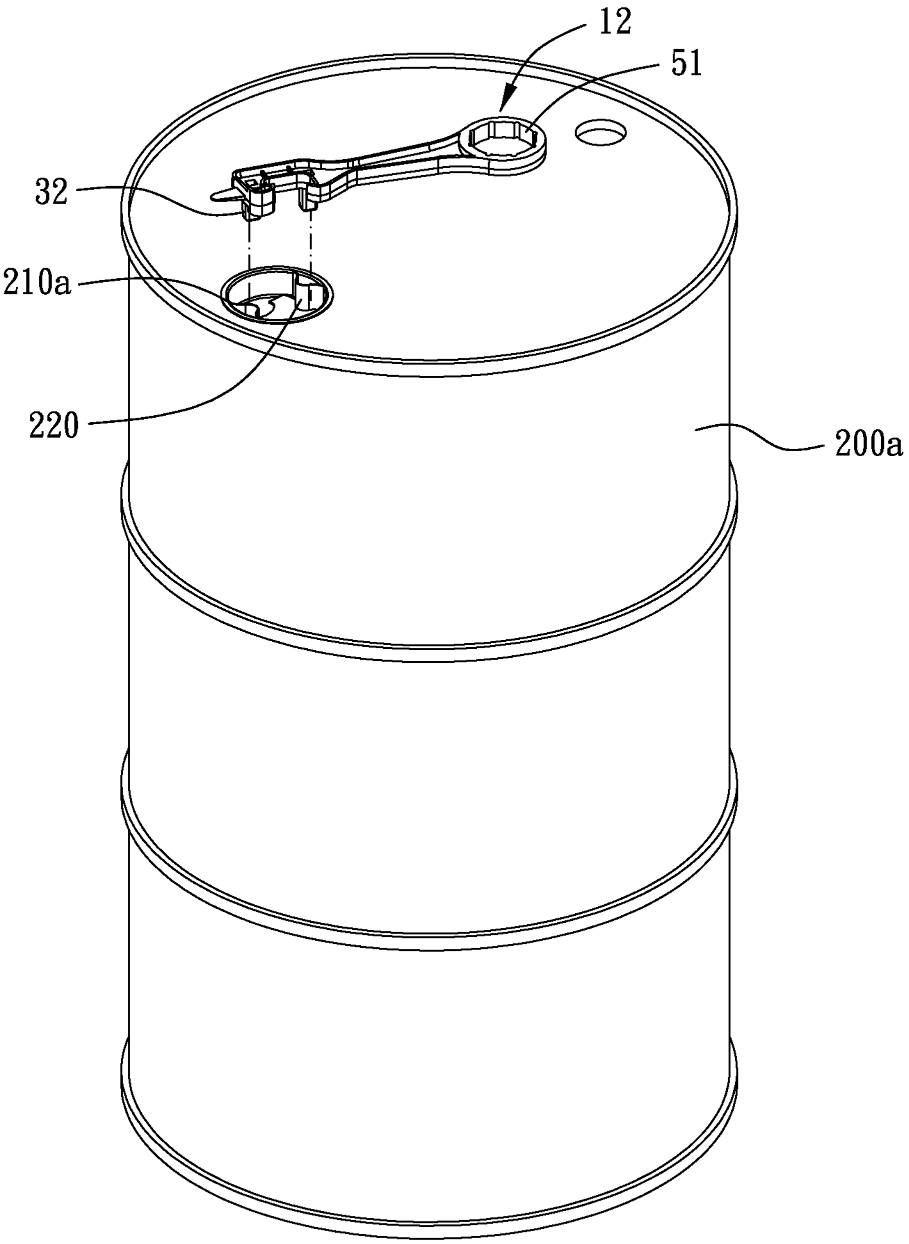
FIG. 6 is a drawing showing operation of a second engaging portion according to a preferable embodiment of the present invention.

The second engaging portion 30 includes two columns 32 spaced apart from each other and extending in the first direction D1, and each of the two columns 32 has a hollow portion 321 extending thereon for lightweight. As shown in FIG. 6, the two columns 32 can be used to be abutted against two protruding members 220 of a lid 210*a* of a container 200*a*, and the second end portion 12 is swung to rotate the lid 210*a* relative to the container 200*a*. Moreover, a tool (such as a screwdriver) may be passed through the through hole 51 to urge the second end portion 12 to swing, which facilitates force application. As viewed in the second direction D2 (FIG. 4), a height of each of the two columns 32 protruding beyond the peripheral wall 14 is equal to or larger than 1.5 times a width of the peripheral wall 14 so that the two columns 32 are high enough to be stably engaged with the two protruding members 220 and easy to operate.

Figure 4:
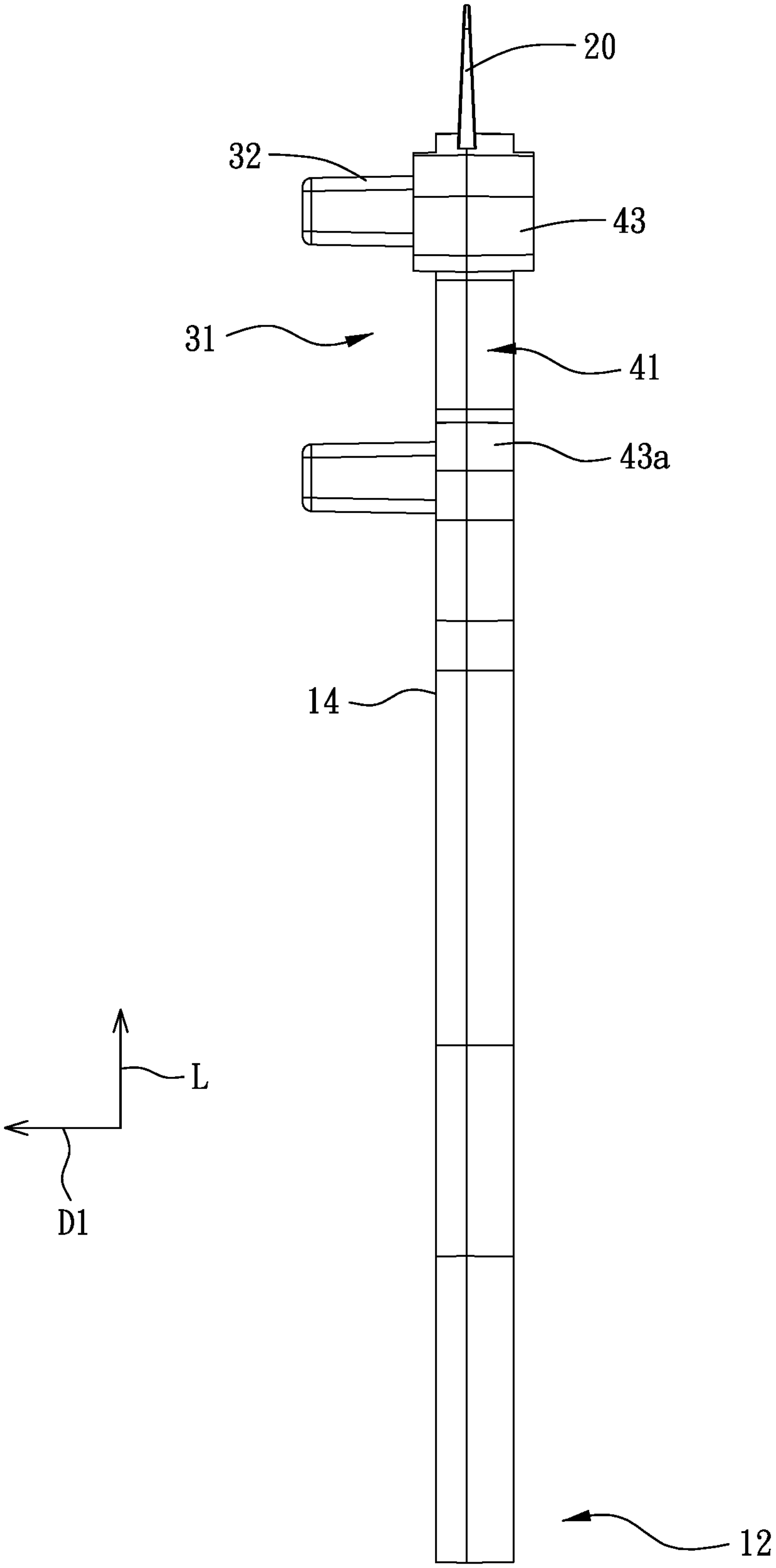
FIG. 4 is a right side view of FIG. 1.
Figure 7:
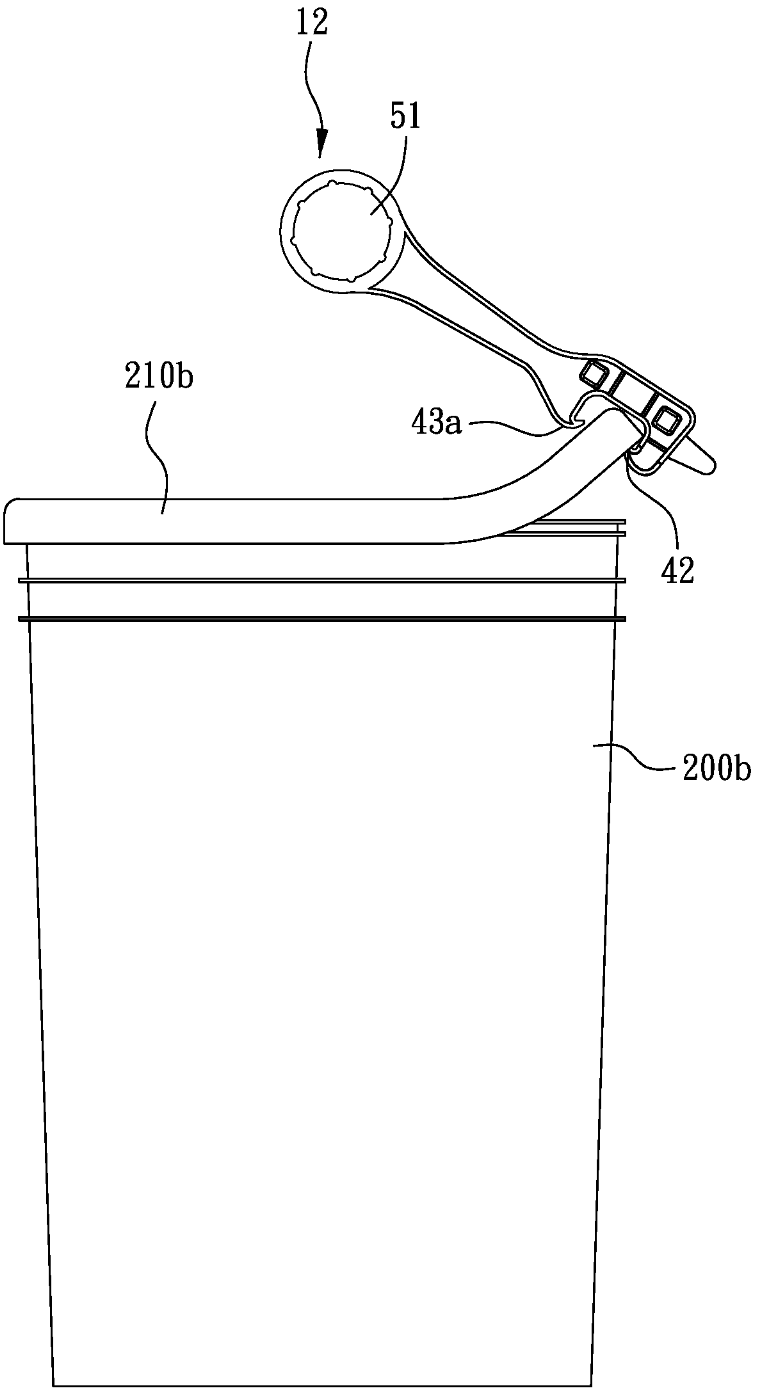
FIG. 7 is a drawing showing operation of a third engaging portion according to a preferable embodiment of the present invention.

The third engaging portion 40 further includes two lips 42, 42*a* and two abutting surfaces 43, 43*a* located at two opposite sides of the second mouth 41. The two lips 42, 42*a* extend toward and within the second mouth 41, and each of the two abutting surfaces 43, 43*a* extends arcuately and is adjacently connected to a side of one of the two lips 42, 42*a* opposite to the second mouth 41. For opening a lid 210*b* of a container 200*b* as shown in FIG. 7, one of the two lips 42 is engaged with an edge of the lid 210*b*, and one of the two abutting surfaces 43*a* adjacent to the other of the two lips 42*a* is pressed against a top surface of the lid 210*b* to lever up the edge. Similar to the operation of the second engaging portion 30, a tool can be passed through the through hole 51 to urge the second end portion 12 to swing with one of the two abutting surfaces 43, 43*a* as a fulcrum. Preferably, as viewed in the second direction D2 (as shown in FIG. 4), a width of one of the two abutting surfaces 43 remote from the second end portion 12 is larger than a width of the other of the two abutting surfaces 43*a*. Therefore, when one of the two lips 42*a* adjacent to the second end portion 12 is engaged with the edge of the container 200*b*, one of the two abutting surfaces 43 remote from the second end portion 12 can be stably positioned and a force exerted thereon is appropriately dispersed. At least one said rib 15 is located between the two columns, and at least one said rib 15 is located between one of the two columns 32 and one of the two lips 42, 42*a* so as to locally increase the structural strength of the main body 10.

Figure 8:
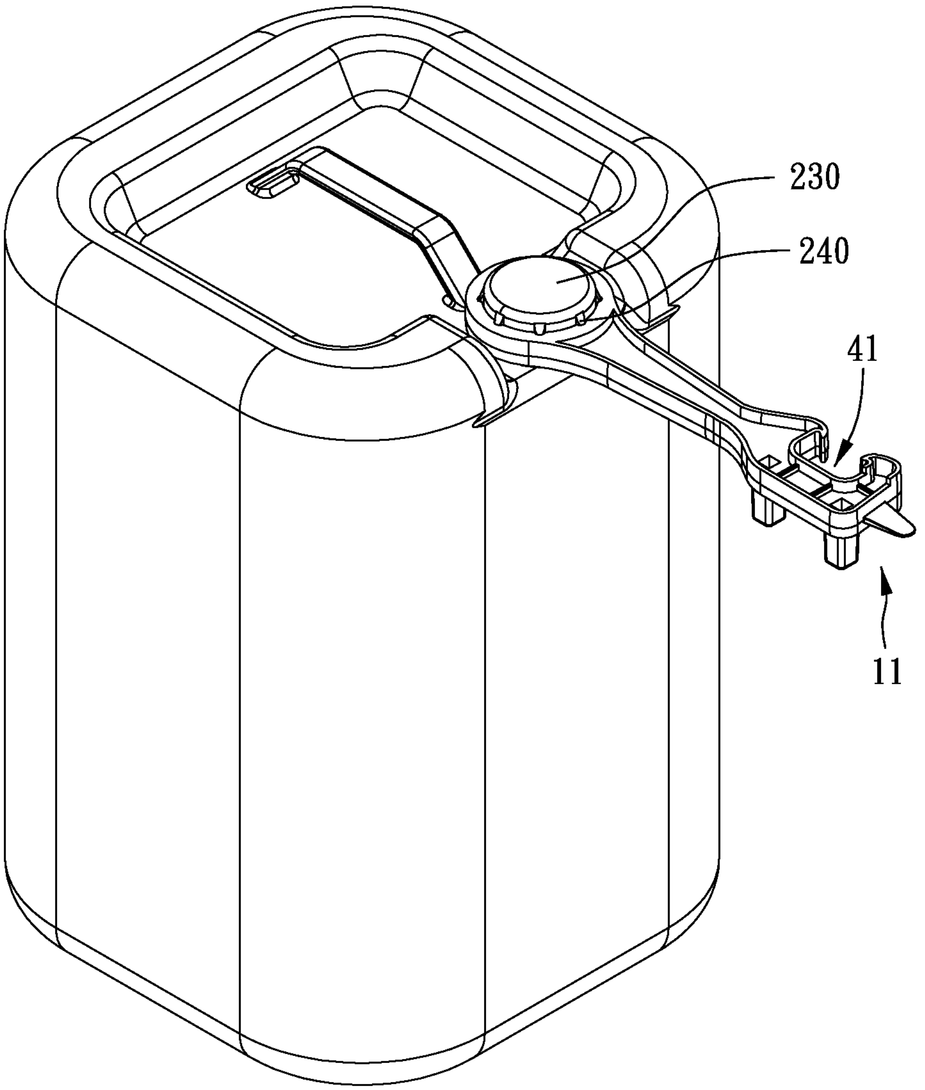
FIG. 8 is a drawing showing operation of a fourth engaging portion according to a preferable embodiment of the present invention.

Preferably, a diametrical dimension of the through hole 51 is larger than or equal to a width of the first end portion 11 in the second direction D2, which provides a large surface for easy gripping and force application. The fourth engaging portion 50 further includes a plurality of recesses 52 disposed on an inner peripheral surface 53 defining the through hole 51, the through hole 51 is circumferentially closed, and the plurality of recesses 52 are configured to be engaged with a plurality of projections 240 of a cap 230, as shown in FIG. 8. The cap 230 may be loosened or tightened by directly swinging the first end portion 11 or by passing a tool through the second mouth 41 to urge the first end portion 11 to swing, which is easy to operate and laborsaving.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A container opening tool, including:

a main body, defining a longitudinal direction and including a first end portion and a second end portion disposed on two opposite sides of the main body in the longitudinal direction;

a first engaging portion, disposed on the first end portion and extending in the longitudinal direction;

a second engaging portion, disposed on the first end portion, including a first mouth opening in a first direction lateral to the longitudinal direction;

a third engaging portion, disposed on the first end portion including a second mouth opening in a second direction lateral to the first direction and the longitudinal direction; and a fourth engaging portion, disposed on the second end portion, including a through hole extending in the first direction;

wherein the second engaging portion includes two columns spaced apart from each other and extending in the first direction, and each of the two columns has a hollow portion extending thereon.

2. The container opening tool of claim 1, wherein a diametrical dimension of the through hole is larger than or equal to a width of the first end portion in the second direction.

3. The container opening tool of claim 1, wherein the main body further includes a connecting section connected between the first end portion and the second end portion, and a width of the connecting section is gradually increased in the longitudinal direction toward the second end portion.

4. The container opening tool of claim 3, wherein the connecting section includes a necked portion connected with the first end portion, and in the longitudinal direction, a width of the necked portion is smaller than the first end portion and the second end portion.

5. The container opening tool of claim 4, wherein a diametrical dimension of the through hole is larger than or equal to a width of the first end portion in the second direction; the main body further includes a peripheral wall extending along an outer contour of the main body, and at least one rib is connected between two portions of the peripheral wall spaced apart from each other; two opposite sides of the main body in the first direction respectively have at least one said rib disposed thereon; one of said ribs corresponds to another one of the said ribs in the first direction; the first engaging portion is a plate extending from an end surface of the main body, and a thickness of the plate is gradually decreased in a direction remote from the second end portion; the end surface extends obliquely relative to the second direction; the third engaging portion further includes two lips and two abutting surfaces located at two opposite sides of the second mouth, the two lips extend toward and within the second mouth, each of the two abutting surfaces extends arcuately and is adjacently connected to a side of one of the two lips opposite to the second mouth, and as viewed in the second direction, a width of one of the two abutting surfaces remote from the second end portion is larger than a width of the other of the two abutting surfaces; at least one said rib is located between the two columns, and at least one said rib is located between one of the two columns and one of the two lips; as viewed in the second direction, a height of each of the two columns protruding beyond the peripheral wall is equal to or larger than 1.5 times a width of the peripheral wall; and the fourth engaging portion further includes a plurality of recesses disposed on an inner peripheral surface defining the through hole, the through hole is circumferentially closed, and the plurality of recesses are configured to be engaged with a plurality of projections of a cap.

6. The container opening tool of claim 1, wherein the main body further includes a peripheral wall extending along an outer contour of the main body, and at least one rib is connected between two portions of the peripheral wall spaced apart from each other.

7. The container opening tool of claim 6, wherein two opposite sides of the main body in the first direction respectively have at least one said rib disposed thereon.

8. The container opening tool of claim 1, wherein the fourth engaging portion further includes a plurality of recesses disposed on an inner peripheral surface defining the through hole, the through hole is circumferentially closed, and the plurality of recesses are configured to be engaged with a plurality of projections of a cap.

9. A container opening tool of claim 1, comprising:

a main body, defining a longitudinal direction and including a first end portion and a second end portion disposed on two opposite sides of the main body in the longitudinal direction;

a first engaging portion, disposed on the first end portion and extending in the longitudinal direction;

a second engaging portion, disposed on the first end portion, including a first mouth opening in a first direction lateral to the longitudinal direction;

a third engaging portion, disposed on the first end portion including a second mouth opening in a second direction lateral to the first direction and the longitudinal direction; and a fourth engaging portion, disposed on the second end portion, including a through hole extending in the first direction;

wherein the third engaging portion further includes two lips and two abutting surfaces located at two opposite sides of the second mouth, the two lips extend toward and within the second mouth, each of the two abutting surfaces extends arcuately and is adjacently connected to a side of one of the two lips opposite to the second mouth, and as viewed in the second direction, a width of one of the two abutting surfaces remote from the second end portion is larger than a width of the other of the two abutting surfaces.

* * * * *